United States Patent [19]

Jones et al.

[11] 4,153,935
[45] May 8, 1979

[54] NAVIGATIONAL AID

[75] Inventors: Keith D. Jones, Thingwall; Geoffrey R. Cowap, Newburgh, both of England; Mark R. Bradshaw, Buckley, Wales

[73] Assignee: Grundy & Partners Limited, Stonehouse, England

[21] Appl. No.: 762,794

[22] Filed: Jan. 25, 1977

[51] Int. Cl.$^2$ .................................. G01S 9/44
[52] U.S. Cl. .......................... 364/461; 343/112 CA
[58] Field of Search .............. 235/150.26, 156, 150.27, 235/150.24; 343/112 CA, 12 MD; 364/461, 462; 340/52 H, 104

[56] References Cited

U.S. PATENT DOCUMENTS

| | | | |
|---|---|---|---|
| 3,162,757 | 12/1964 | Zaklad | 235/150.26 |
| 3,195,136 | 7/1965 | Klein | 343/12 MD |
| 3,260,478 | 7/1966 | Welti | 364/461 |
| 3,737,902 | 6/1973 | O'Hagan et al. | 343/112 CA |
| 3,757,324 | 9/1973 | Litchford | 343/112 CA |
| 3,939,334 | 2/1976 | Roth et al. | 235/156 |

*Primary Examiner*—Malcolm A. Morrison
*Assistant Examiner*—Errol A. Krass
*Attorney, Agent, or Firm*—Cushman, Darby & Cushman

[57] ABSTRACT

A navigational aid enables the effect of a course and/or speed alteration of one vessel on the nearest possible approach distance of another vessel to be calculated, using data readily obtainable from a simple relative radar display on said one vessel. The aid comprises a plurality of sealed manually-settable means for individually setting in data inputs respectively representative of the following:

(1) the minimum nearest approach distance if no course or speed change is made;
(2) the range of said other vessel;
(3) the present speed of said one vessel;
(4) the proposed course alteration;
(5) the proposed speed alteration; and
(6) the time for which the proposed course and speed will be held.

The aid further comprises means to compute from the foregoing input data the resultant nearest possible approach with the proposed manoeuvre, and indicating means to provide an indication of said resultant nearest possible approach.

6 Claims, 6 Drawing Figures

NAVIGATIONAL AID

BACKGROUND OF THE INVENTION

This invention relates to navigational aids, and in particular to a navigational aid for calculating the effect of a course and/or speed alteration of one sea-going vessel on the nearest approach distance of another such vessel.

In an encounter between two vessels which could result in a collision, the steering rules usually require one vessel to keep out of the way of the other. Only in the case of vessels meeting "end on" are both vessels required to take action, and alter course to starboard. The manoeuvre demanded in this latter case will always produce a clearing situation in which the bearing of one vessel from the other changes in an anticlockwise sense, i.e. each passes down the port side of the other. This anticlockwise rotation of the line of sight to the other vessel has become accepted by mariners as the usual convention for a safe passing, and in the ordinary practices of seamen the give way ship in other encounters usually tries to produce this condition. For example, a ship threatened by another ship closing from an angle on the starboard bow will invariably alter course to starboard, if sea room permits, and thus make the bearing change anticlockwise.

During periods of reduced visibility when ships are manoeuvring by radar information alone and both parties in the encounter are free to take action, their combined actions may accelerate rather than clear the collision risk if one attempts to make the bearing change clockwise while the other alters to make the change anticlockwise. In these situations safety may be increased if both ships alter in a complementary fashion (i.e. both act to rotate the sight line the same way). Keeping in mind the established practice of mariners which prefers to see an anticlockwise rotation of the bearing of the other ship, it follows that in these situations where ships can alter at random, action which will produce anticlockwise rotation is more likely to be successful since there is less chance of the other vessel taking an action which will cancel it.

Thus in all situations the preference of the mariner is to try to find an alteration which will produce anticlockwise rotation. A brief consideration of any situation when two vessels meet on a collision course, and then alter to avoid each other, must show that the effectiveness of the manoeuvre of your own ship is very dependent upon a number of factors. It will be obvious that it is never possible to forecast the eventual outcome of a situation if the intended action of the other ship must remain an unknown quantity, and thus the best a navigator can do is calculate, for a proposed alteration of his own course and/or speed together with the length of time for which the manoeuvre is to be held, how much his own ship will contribute to clearing the existing situation, and determine the direction in which the relative bearing of the ships will change.

In an encounter between two ships it is at present difficult for a navigator to determine the contribution to the avoidance of a collision which a given course and/or speed alteration of his own vessel will make towards avoiding a collision, the normal procedure involving a complex triangulation computation which requires that the true course and speed of the other vessel be determined. This not only wastes valuable time but the errors which may result from the initial computation of the true course and speed of the other vessel, and from the tracking which precedes it, can have a considerable effect on the effectiveness of the manoeuvre finally decided upon. Most ships are now fitted with radar apparatus the display of which enables the relative bearing of another ship approaching on a near miss or collision course to be determined quickly and accurately, and the present invention stems from the appreciation that it is possible to calculate the effect of a course and/or speed alteration of one vessel on the nearest approach distance of another vessel when the relative motion only of that other vessel is known, in other words that it is not necessary to determine or compute the true course and speed of the other vessel. A mathematical basis for this is set out later in this specification.

The object of the invention is to provide a navigational aid which will provide a means of determining optimum strategies in a collision avoidance situation when used in conjunction with a simple relative radar display, and at a cost which is a fraction of that of a normal sophisticated collision avoidance system as at present used in large vessels.

SUMMARY OF THE INVENTION

According to the invention a navigational aid, for calculating the effect of a course and/or speed alteration of one vessel on the nearest approach distance of another vessel, the relative bearing of which is known, comprises a plurality of scaled manually-settable means for individually setting in data inputs respectively representative of said relative bearing, the minimum nearest approach distance if no course or speed change were made, the range of said other vessel and, in respect of said one vessel, the present speed, a proposed course alteration, a proposed speed alteration and the proposed time for which the proposed course and speed will be held, means to compute from said input data the resultant nearest possible approach with the proposed manoeuvre with the computation based on the equation $$\text{Final nearest approach (minimum)} = P + [\sqrt{1-(P/R)^2}[u \sin \theta + v \sin(A-\theta)] + (P/R)[u \cos \theta - v \cos(A-\theta)]]t$$

as hereinafter derived, and indicating means to provide an indication of said resultant nearest possible approach.

An aid in accordance with the invention can be used in a number of different ways. Starting from the simple role of a manoeuvre indicator, the equipment can eventually be employed in the most complex situation as the navigator's skill increases. As it depends primarily on determination of relative bearing, and does not require resolution of the target vessel's course and speed, the equipment is equally effective with either true motion or relative motion modes of radar display but the type of information used is more easily extracted from a relative radar presentation. The inputs required are those quantities which are immediately available to a navigator, even with the most elementary radar installation, and the effect of changes in own ship's course, speed and manoeuvre time upon the nearest approach distance of the target vessel are quickly and reliably determined.

Said means to compute may be, and preferably are, programmed to carry out said computation ignoring, as unimportantly small, the final term $-\frac{1}{2}(P/R)^2[u \sin \theta + v \sin(A-\theta)]t$ of said equation since the nearest approach p will be much smaller than the range R in practical applications. The indicating means desirably have a centre-zero scale and the direction of scale movement indicates whether the proposed alterations will result in the relative bearing of the vessels changing either clockwise or anticlockwise. In a preferred embodiment the proposed speed change is set in as a proposed new speed.

As will be clear from the mathematical analysis later in this specification, said means to compute have to determine four quantities, namely Sin $\theta$, Sin $(A-\theta)$, Cos $\theta$ and Cos $(A-\theta)$, where:

A is the proposed course change, and $\theta$ is the relative bearing of the target vessel.

These quantities are conveniently derived as voltage signals for use in an analogue computing network, and these signals may be obtained as the outputs from two resolvers providing a differential arrangement of two sine-cosine potentiometers. Such a potentiometer is well known per se and when fed with a constant track voltage provides two wiper voltages respectively proportional to the sine and cosine of the angular displacement of the potentiometer shaft.

In said equation, which is derived mathematically later in this specification, the quantities u Sin $\theta$, v Sin $(A-\theta)$, u Cos $\theta$ and v Cos $(A-\theta)$ appear, where u and v are respectively the proposed new and original speeds, and thus said sine-cosine potentiometers may respectively be provided with reference voltages supplied from potentiometers the settings of which are representative of said two speeds, respectively.

When taking collision avoiding action with respect to a convergent target vessel it is clearly desirable to compute the effect of the proposed manoeuvre with respect to passing vessels initially on a divergent course, in order to ascertain that a manoeuvre to avoid the target vessel does not put one on a collision course with respect to a passing vessel. As is clear from said mathematical derivation two of the quantities involved in the computation must be looked on as negative in the case of a convergent target vessel, and the aid of the invention preferably has a pushbutton or switch which, when actuated, operates to reverse the effective sign of these two quantities so far as the computing network is concerned whereby to cover the case of a divergent vessel.

Other objects and features of the present invention will appear more fully below from the following detailed description considered in connection with the accompanying drawings which disclose one preferred embodiment of the invention. It is to be expressly understood, however, that the drawings are designed for purposes of illustration only and not as a definition of the limits of the invention, reference for the latter purpose being had to the appended claims.

DESCRIPTION OF THE PREFERRED EMBODIMENT

Figure 1:
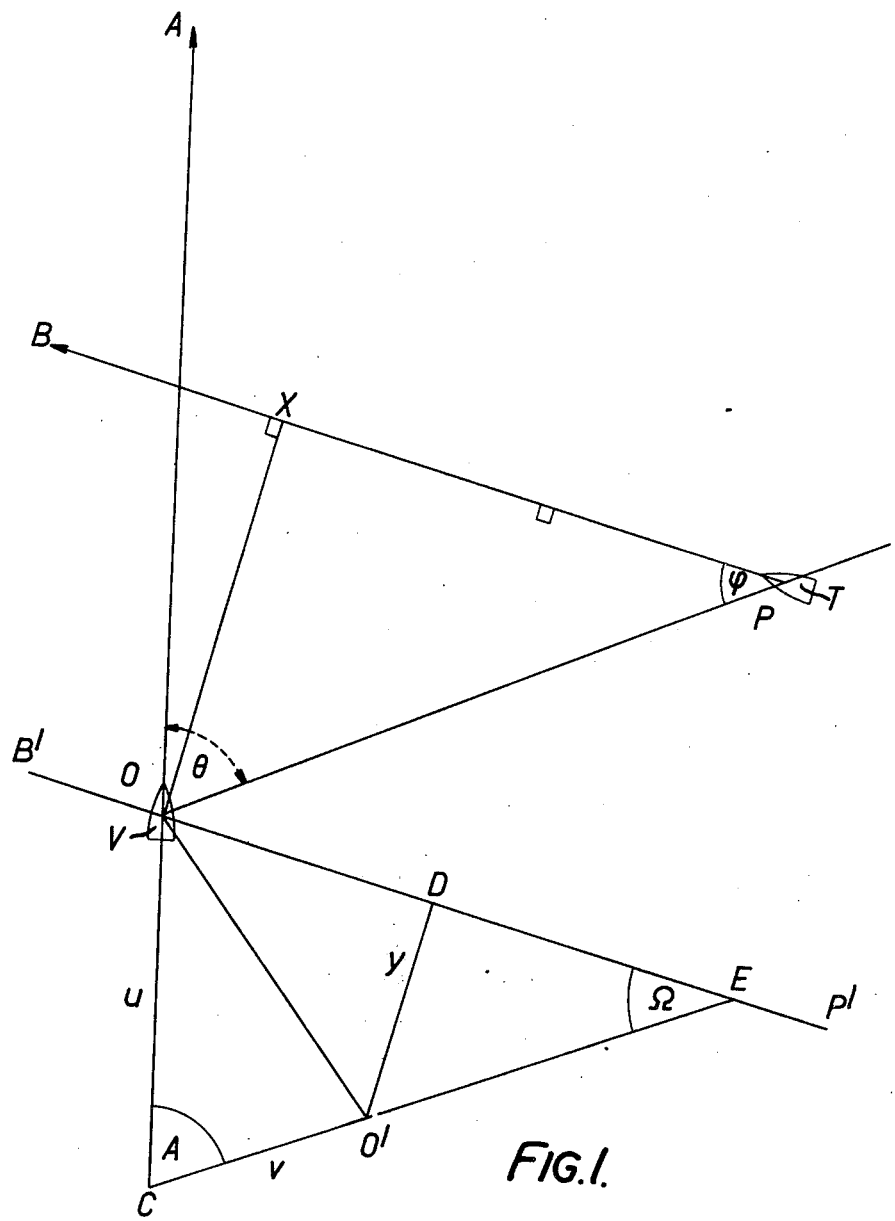
FIGS. 1 and 2 are vector diagrams illustrating the effect of course and/or speed changes of one vessel on the nearest approach distance of a target vessel.

The mathematical basis of the computation carried out by the equipment forming the illustrative embodiment to be described will now be derived with reference to FIG. 1. In that figure consider the situation with a vessel V at position O on a course OA, and a target vessel T at position P, on a convergent relative course PB which is the line followed by the target echo on relative- motion head-up radar display. The relative bearing $\theta$ of vessel T, which can be taken from the radar display, is hereinafter referred to as "the threat angle". If X is a point on PB where OX is perpendicular to PB, then OX is the nearest possible approach if no course or speed changes are made and is hereinafter referred to as the "original nearest approach". OP, that is, the present distance between the vessels, in hereinafter referred to as the "threat range".

Immediately below position O there is drawn in FIG. 1 a vector diagram OCO'D, where P'B' is a line parallel to PB and to which O'D is perpendicular.

Letting u knots be the present speed of vessel V, v knots be the proposed changed speed of vessel V, A be the proposed course change of vessel V, y be the rate of contribution to vessel clearance of the proposed manoeuvre, and t be the time for which proposed course and/or speed changes are held.

Then if vectors $\overline{CO}$ and $\overline{CO'}$ are respectively $\overline{u}$ and $\overline{v}$, and $OCO'=A$, then $y=O'D$ Further letting R=threat range p=original nearest approach and extending OD and C' to intersect at E, letting $DEO'=\Omega$ and $OPX=\phi$ $$\text{then } y = O'E \text{ Sin } \omega \quad (1)$$

$$\text{and } u/\text{Sin } \omega = (v + O'E)/\text{Sin}(\theta + \phi) \quad (2)$$

from (1) and (2)

$$y = u \cdot \text{Sin } (\theta + \phi) - v \cdot \text{Sin } \omega$$

but $\omega = \theta + \phi - A$ $$y = u \cdot \text{Sin } (\theta + \phi) - v \cdot \text{Sin } (\theta - A + \phi) = u \cdot \text{Sin } \theta \text{ Cos } \phi + u \cdot \text{Cos } \theta \text{ Sin } \phi - [v \cdot \text{Sin } (\theta - A) \text{ Cos } \phi + v \cdot \text{Cos } (\theta - A) \text{ Sin } \phi)] = u \cdot \text{Sin } \theta \text{ Cos } \phi + u \cdot \text{Cos } \theta \text{ Sin } \phi - v \cdot \text{Sin } (\theta - A) \text{ Cos } \phi - v \cdot \text{Cos } (\theta - A) \text{ Sin } \phi = u \cdot \text{Sin } \theta \text{ Cos } \phi + u \cdot \text{Cos } \theta \text{ Sin } \phi + v \cdot \text{Sin } (A - \theta) \text{ Cos } \phi - v \cdot \text{Cos } (A - \theta) \text{ Sin } \phi = \text{Cos } \phi (u \cdot \text{Sin } \theta + v \cdot \text{Sin } (A - \theta)) + \text{Sin } \phi (u \cdot \text{Cos } \theta - v \cdot \text{Cos } (A - \theta))$$

since $\cos \phi = \sqrt{1-(P/R)^2}$ $\sin \phi = P/R$, then $$y = \sqrt{1-(P/R)^2}[u \text{ Sin } \theta + v \text{ Sin}(A-\theta)] + (P/R)[u \text{ Cos } \theta - v \text{ Cos } (A-\theta)].$$

However, since the term $\sqrt{1-(P/R)^2}$ can be expanded by the binomial theorem with only the first two terms considered significant, the following simplified formula results:

*Final nearest approach (minimum)* $=p+yt=p+\{u \cdot \text{Sin } \theta+v \cdot \text{Sin } (A-\theta)+P/R[u \cdot \text{Cos } \theta-v \cdot \text{Cos } (A-\theta)]\}t$ and this is the equation solved by the computing circuit of the embodiment later described.

Figure 2:
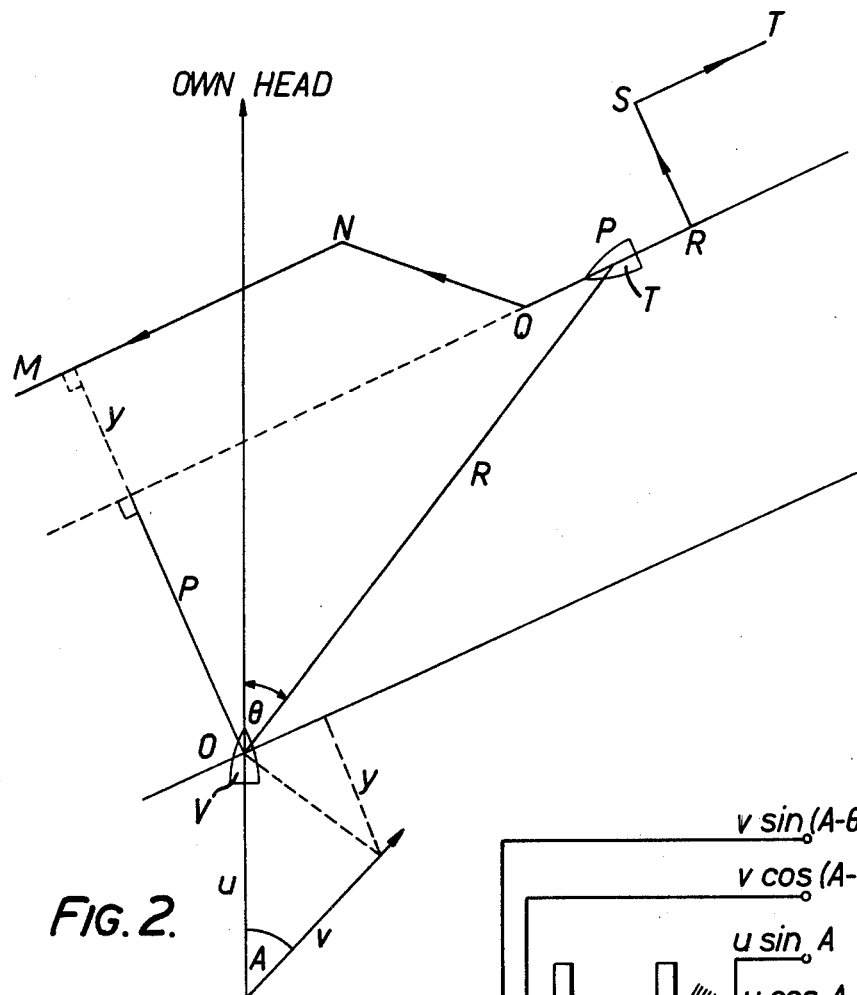

FIG. 2 is a vector diagram showing how the effect of a proposed manoeuvre, with respect to a convergent target vessel T, can be computed in respect of the clearance distance relative to a passing vessel on a divergent bearing. In this figure a target vessel T is again at point P, range R with respect to vessel O.

If the apparent motion is such that vessel T follows the track PQ then the vessels are, as before, convergent. The current miss distance or original nearest approach is equal to p miles, and since the bearing is changing anticlockwise this quantity p is conventionally termed positive. An alteration of course by A degrees and a speed change in the ratio of u/v held for t minutes will generate a distance contribution y, this is also positive when taken from the formula derived with reference to FIG. 1, and results in the final miss distance of p' miles which is the algebraic sum of y and p. The target echo on the relative radar display would follow the line of motion PQNM.

If the target vessel T follows the track PR then the ships are divergent, and it is desirable to ascertain that a manoeuvre chosen with respect to a convergent vessel on a possible collision course will not result in a similar condition with respect to an originally divergent passing vessel. The absolute values of p and p' are evidently the same for the same conditions of A, u, and v but since the target bearing is changing clockwise in the divergent case they must be conventionally termed negative. It thus follows that the sign of p to be used in the formula already derived must be reversed before entering the computation, and that the value of y derived from the computation must also be reversed. The divergent target echo follows the line PRST, and the resultant divergent computation can be effected with the present embodiment as will be described.

Figure 3:
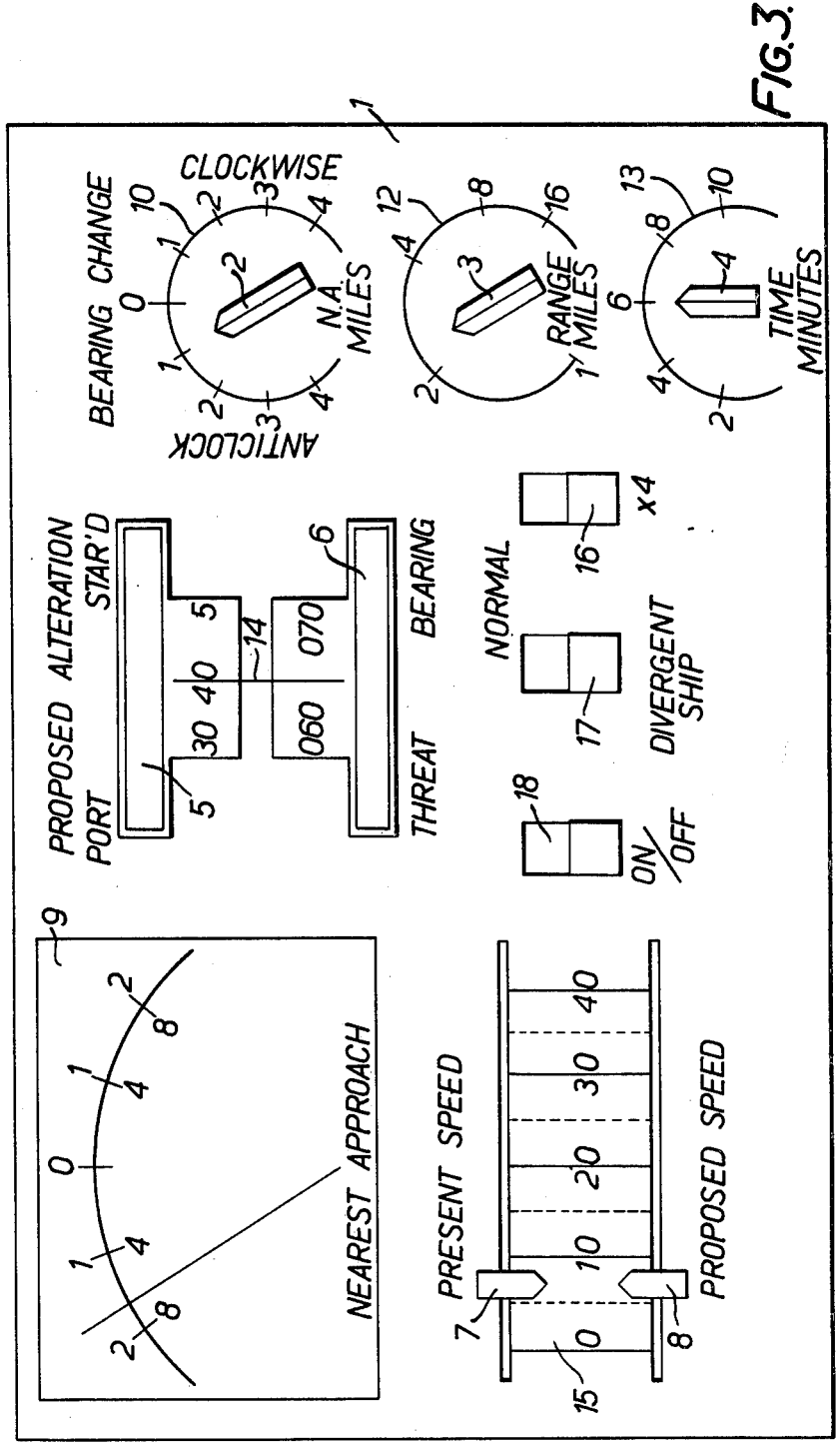
FIG. 3 is a view of a control panel of the instrument.

The equipment is housed in a rectangular casing and is either mains or rechargeable battery powered, or both. It is conveniently portable although if desired may be adapted for console or bulkhead mounting. A front control panel 1 is as shown in FIG. 3 with three rotary knobs 2, 3 and 4, two rotary thumb-wheels 5 and 6, and two linear sliders 7 and 8 for setting in the various analogue inputs manually. An analogue output is provided by an output meter 9 with a centre-zero scale.

By means of potentiometer knob 2, the closest possible minimum approach or "pass" distance can be set in, the associated centre-zero scale 10 being calibrated +4:0:−4 nautical miles thus allowing the sense of the pass distance, i.e. to port or to starboard, to be taken account of. Potentiometer knob 3 allows the range of the threat to be set in, the associated scale 12 being calibrated from 1 to 16 miles. Knob 4 is used to set in the time for which it is proposed to hold the course and/or speed change, the associated scale 13 being calibrated at 2 minute intervals over the range 2 to 10 minutes.

The thumb-wheels 5 and 6, respectively coupled to sine-cosine potentiometers of a differential rotational arrangement, as will be described, are set with respect to a common index line 14, and are respectively calibrated over the range 0° to 180° and 0° to 360° in terms of proposed course change A and threat bearing $\theta$. Wheel 5 has a centre-zero scale, so that it can be set according to whether the proposed change is to port or starboard. Sliders 7 and 8 are associated with a common scale 15, calibrated 0 to 40 knots, slider 7 being used to set in the present speed u and slider 8 the proposed changed speed v.

The centre-zero scale meter 9 is a nearest approach meter which indicates the closest possible approach with the proposed manoeuvre and which is calibrated +2:0:−2 and +8:0:−8. A spring-loaded piano key 16 marked X4 is depressed when the smaller range scale is required, and a similar switch 17 is depressed when the case of a divergent ship is being considered. The only other control on the panel 1 is an ON/OFF switch 18.

Figure 4:
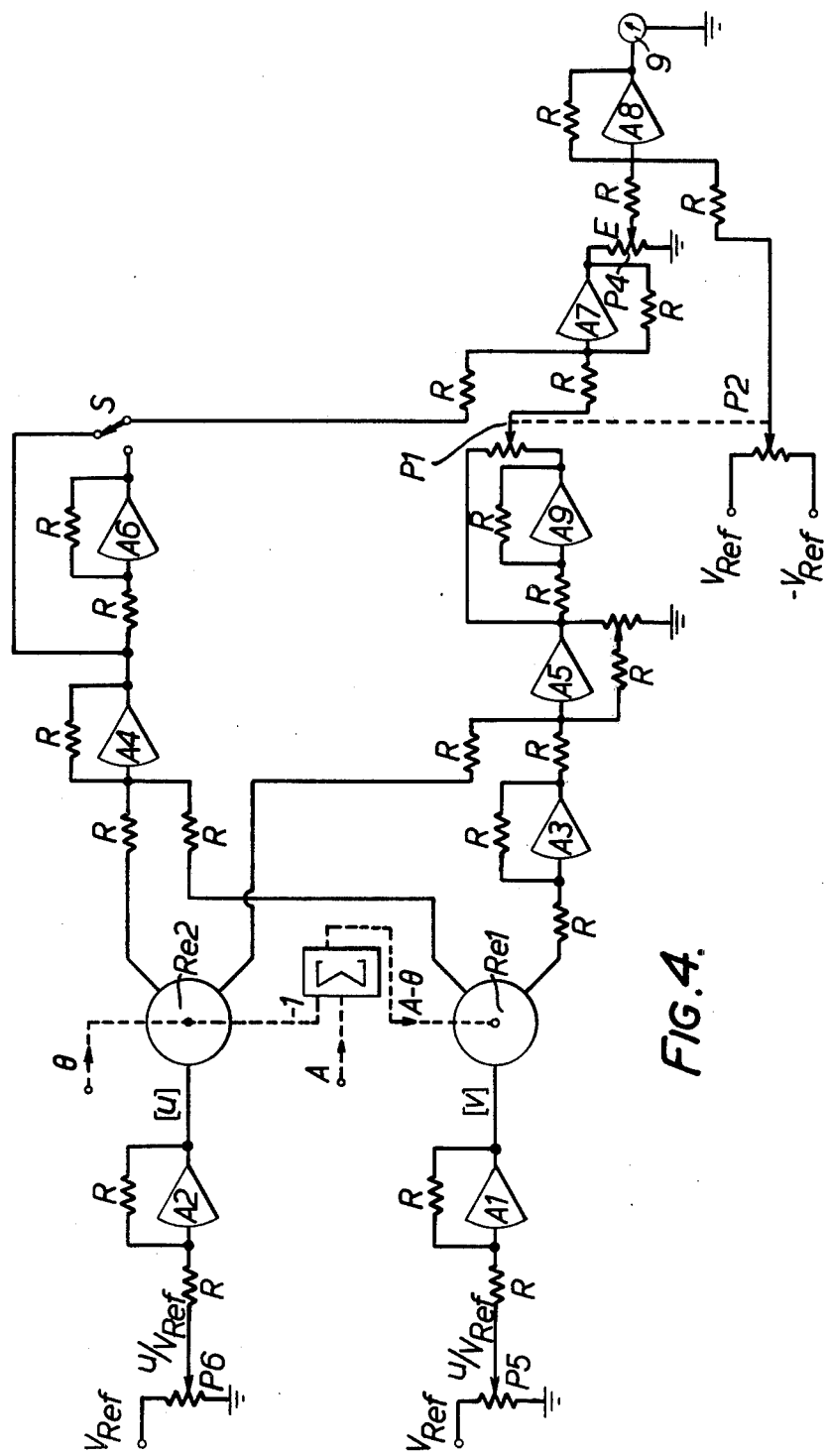
FIG. 4 is a circuit diagram of the instrument.

Referring now to the circuit diagram of FIG. 4, the knob 2 is coupled to ganged linear potentiometers P1 and P2. The knob 3 is coupled to a linear range potentiometer P3, and knob 4 is coupled to a linear time potentiometer P4. Resolvers Re1 and Re2, which are said differentially coupled sine-cosine potentiometers, are fed with reference voltages respectively representative of proposed speed v and original speed u from linear potentiometers P5 and P6. The shafts of Re1 and Re2 are coupled to the course change thumb-wheel 5, and the body of Re2 is coupled to the threat bearing thumb-wheel 6. Potentiometers P5 and P6 are respectively coupled to the speed sliders 8 and 7. The divergent ship switch 17 is indicated by switch S in FIG. 4, and the potentiometers P2, P5 and P6 are grounded and supplied with a constant track reference voltage $V_{Ref}$.

Figure 5:
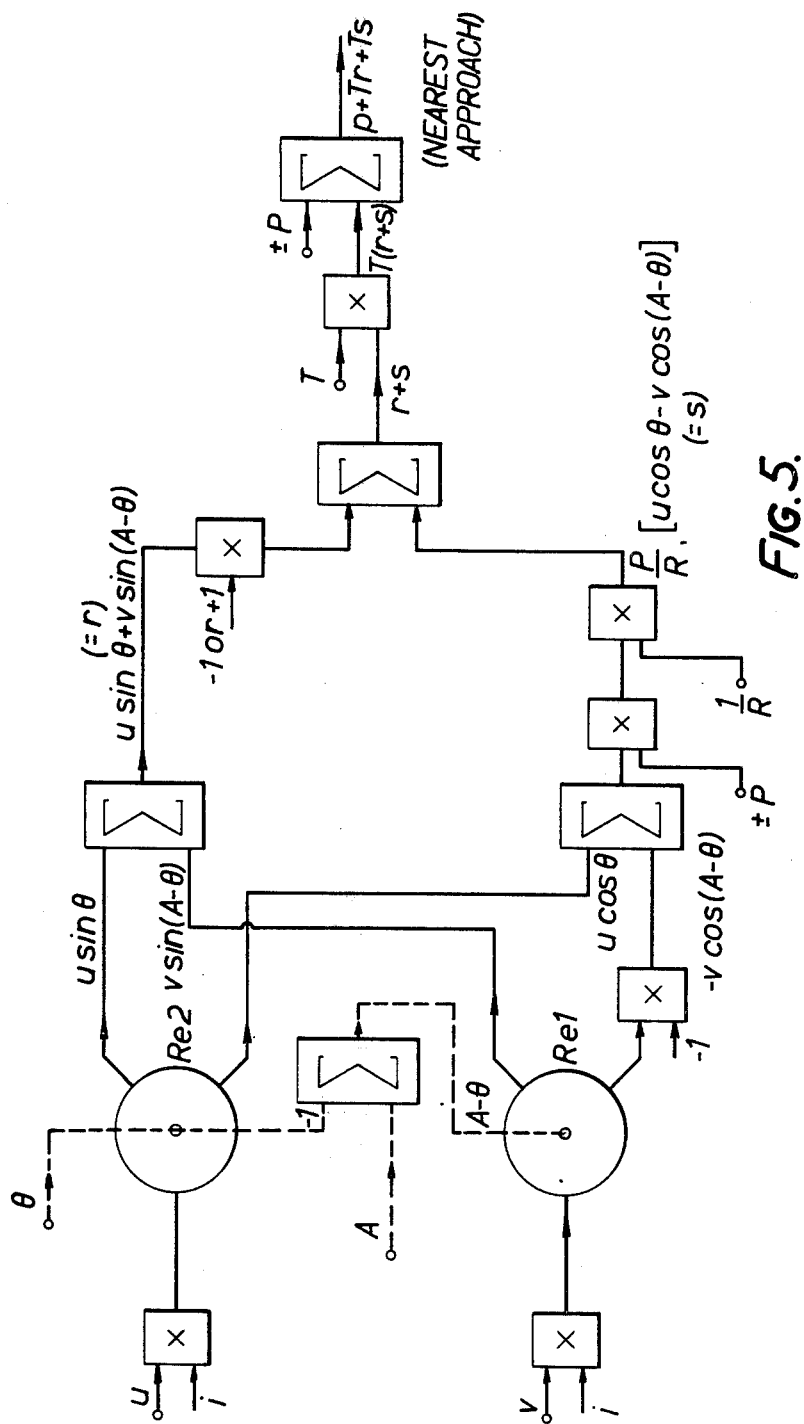
FIG. 5 is a corresponding block diagram.

It is believed that the operation of the circuit illustrated will be clear from the following brief description in conjunction with the block diagram of FIG. 5. The block diagram shows the implementation of the said equation $$p + yt = p + \{u \cdot \sin \theta + v \cdot \sin (A - \theta) + p/R[u \cdot \cos \theta - v \cdot \cos (A - \theta)]\}t$$

using adding and multiplying elements and the two resolvers Re1 and Re2 differentially coupled together.

Reverting to the circuit diagram of FIG. 4, amplifiers A1 and A2 buffer the outputs of speed potentiometers P5 and P6, and the buffered outputs representing u and v are fed to the resolvers Re1 and Re2. The resolver outputs, with appropriate inversion at amplifier A3, are summed in appropriate pairs at amplifiers A4 and A5. The amplifier A5 has attenuated feedback via the range potentiometer P3, which serves to divide the output of amplifier A5 by the range R. The amplifier output is then multiplied by the nearest approach p at potentiometer P1, and p is also explicitly derived by the ganged potentiometer P2. Amplifier A9 and reference voltage $-V_{Ref}$ allow the sense of p to be accounted for.

Amplifier A6 with its associated network serves to provide a switched inversion, i.e. the mathematical sign can be changed as required by the mathematical presentation for a particular convention applied to signs of parameters and variables. Specifically, it allows the effect of a proposed manoeuvre on the nearest approach to a divergent passing vessel to be computed.

The output of amplifier A7 represents the clearance contribution rate y of the proposed manoeuvre, and is multiplied by time t at potentiometer P4 to yield a corresponding distance contribution y. The nearest approach distance p derived from said potentiometer P2 is summed with y at amplifier A8 to provide a resultant deflection on the centre-zero meter 9. The meter deflection, positive or negative, represents the resultant minimum possible approach distance if the target vessel maintains the original course.

Figure 6:
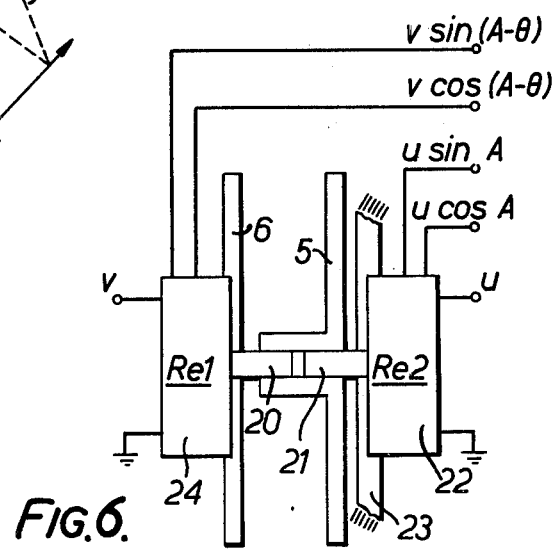
FIG. 6 is a diagrammatic view illustrating a differential sine-cosine potentiometer arrangement used in the instrument.

FIG. 6 illustrates diagrammatically the arrangement of the resolver potentiometers Re1 and Re2. The track of Re1 is supplied with a reference voltage v as has been described, and the track of Re2 with the reference voltage u, providing the outputs v·Sin (A−θ) and v·Cos (A−θ), and u·Sin A and u·Cos A, respectively. The rotary shafts 20 and 21 of the two potentiometers are aligned and coupled together by and within the proposed course change A thumb-wheel 5, and the track body 22 of Re2 is attached to a support 23 which is fixed to the instrument case and supports the complete potentiometer assembly illustrated in FIG. 6. The track body 24 of Re1 is directly attached to the threat bearing θ thumb-wheel 6 for rotation therewith.

Each of the potentiometers is of conventional sine-cosine type with two wipers which respectively pick off voltages $V_{Ref}$·Sin α and $V_{Ref}$·Cos α from the non-linear potentiometer track, where α is the angle of shaft rotation from a datum position and $V_{Ref}$ is the applied track voltage. In the present assembly the shaft 21 of the fixed-body potentiometer Re2 is turned through an angle A as indicated by the graduated cylindrical thumb-wheel dial with reference to the common datum indicating line 14 on the instrument case, from which the two thumb-wheels 5 and 6 appropriately protrude. Thus the wiper voltages of Re2 are u·Sin A and u·Cos A.

The body of Re1 is turned, relative to the datum line 14 (FIG. 3), through the course change angle A. However, as the shaft 20 has already been turned through the angle θ the differential displacement, i.e. displacement of shaft 20 relative to body 24, is only (A−θ). Thus the wiper voltages of Re1 are v·Sin (A−θ) and v·Cos (A−θ).

The equation derived provides a result which is sufficiently accurate for all normal navigational situations. A more simple formula can readily be derived which in many situations will be sufficiently accurate, and which allows a more simple computing circuit in accordance with the invention to be employed. According to this more simple formula,

*distance contribution* $y = [u·\text{Sin } \theta + v·\text{Sin } (A−\theta)]t$ but the more accurate formula derived with reference to FIG. 1 is more preferably employed. It will be appreciated that an embodiment solving the simple formula does not require the range of the threat to be set into the instrument.

It will also be appreciated that a navigational aid in accordance with the invention can be designed to indicate the contribution y directly, so that the approach distance p does not then have to be set in if computing according to said simple formula.

We claim:

1. A collision avoidance apparatus for determining the nearest approach distance of a first vessel with respect to a second vessel comprising:
    means for generating a first signal u proportional to the present speed of said first vessel,
    means for generating a second signal v proportional to a selected change in speed of said first vessel,
    means for generating a signal proportional to the present nearest approach distance P,
    means for generating a signal proportional to the inverse of the present distance R between said first and second vessels,
    first means for multiplying said first speed proportional signal u by the sine of the angle θ between the direction of travel of said first vessel and the direction to said second vessel to derive a signal proportional to u Sine θ,
    second means for multiplying said speed proportional signal u by the cosine of the angle θ to derive a signal proportional to u cos θ,
    third means for multiplying said second speed proportional signal v by the sine of the difference angle between the angle A defining the selected change in course direction and the angle θ to derive a signal proportional to v sin (A−θ),
    fourth means for multiplying said second speed proportional signal by the cosine of said difference angle to derive a signal proportional to v cos (A−θ),
    first summing means for generating the sum of the signals proportional to u sin θ + v sin (A−θ),
    second summing means for generating a signal proportional to u cos θ − v cos (A−θ),
    fifth means for multiplying said signal proportional to [u cos θ − v cos (A−θ)] and P/R,
    means for adding said signals proportional to u sin θ and v sin (A−θ),
    third summing means responsive to said adding and said fifth multiplying means for deriving a signal proportional to (P/R)[u cos θ − v cos (A−θ)] + [u sin θ + v sin (A−θ)], said signal being equal to y,
    sixth means for multiplying the time t during which said selected change in speed and course direction takes place by y to thereby generate the signal yt,
    means for adding the signal proportional to the present nearest approach distance P to yt to thereby generate a nearest approach signal P+yt, and
    means for displaying said nearest approach signal.

2. A collision avoidance apparatus for determining the nearest approach distance of a first vessel with respect to a second vessel, comprising:
    means for generating a first signal u proportional to the present speed of said first vessel,
    means for generating a second signal v proportional to a selected change in speed of said first vessel,
    means for generating the cosine of the angle φ between the direction of travel of said second vessel and the direction to said first vessel,
    means for generating the sine of the angle φ,
    first means for multiplying said first speed proportional signal u by the sine of the angle θ between the direction of travel of said first vessel and the direction to said second vessel to derive a signal proportional to u sin θ,
    second means for multiplying said speed proportional signal u by the cos θ to derive a signal proportional to u cos θ,
    third means for multiplying said second speed proportional signal v by the sine of the difference angle between the angle A defining the selected change in course direction and the angle θ to derive a signal proportional to v sin (A−θ),
    fourth means for multiplying said second speed proportional signal by the cosine of said difference angle to derive a signal proportional to v cos (A−θ),
    first summing means for generating the sum of the signals proportional to u sin θ + v sin (A−θ),
    second summing means for generating a signal proportional to u cos θ − v cos (A−θ),
    fifth means for multiplying said signal proportional to [(u cos θ − v cos (A−θ)] and sin φ, means for adding said signals proportional to $u \sin \theta$ and $v \sin (A-\theta)$, sixth means for multiplying said added signal to generate a signal proportional to $\cos \phi (u \sin \theta + v \sin (A-\theta))$, third summing means for generating a signal proportional to $\cos \phi(u \sin \theta + v \sin (A-\theta)) + \sin \phi(u \cos \theta - v \cos (A-\theta))$, said signal being equal to y, seventh means for multiplying the time t during which said selected change in speed and selected change in course direction takes place by y to thereby generate the signal yt, means for adding the signal proportional to the present nearest approach distance P to yt to thereby generate a nearest approach signal P+yt, and means for displaying said nearest approach signal.

3. The navigational aid, according to claim 2, wherein said display means includes a center-zero scale and wherein the direction of scale movement indicates whether the proposed alterations in speed and course will result in said relative bearing changing either clockwise or counterclockwise.

4. A collision avoidance system for determining the effect of a course or speed change on the nearest approach distance of a first vessel with respect to a second vessel comprising:

a pair of sine-cosine potentiometers differentially ganged together, means for rotating said potentiometers in accordance with the relative bearing of said second vessel with respect to said first vessel and in accordance with a proposed change in course direction of said first vessel, said rotating means adjusting the differential arrangement of said sine-cosine potentiometers, the output voltage of said potentiometers corresponding to the quantities of $\sin \theta$, $\sin (A-\theta)$, $\cos \theta$ and $\cos (A-\theta)$ where $\theta$ is said relative bearing and A is the proposed course change, and means for computing the nearest possible approach with said proposed change in course direction of said first vessel in accordance with the following equation:

$$\text{nearest approach} = P + [[u \sin \theta + v \sin (A-\theta)] + (P/R)[u \cos \theta - v \cos (A-\theta)]]t$$

where

P is the present nearest approach distance, u is the present speed of said first vessel, v is the selected change in speed of said first vessel, R is the present distance between said first and second vessels, and t is the proposed time for which the proposed course and speed changes will be held.

5. A collision avoidance system according to claim 4 further comprising:

means for generating a first signal u proportional to the present speed of first vessel, means for generating a second signal v proportional to a selected change in speed of said first vessel, and means for coupling said signals to said differentially ganged potentiometers whereby the output voltages of said ganged potentiometers are $u \sin \theta$ $v \sin (A-\theta)$, $u \cos \theta$ and $v \cos (A-\theta)$.

6. A collision avoidance system of claim 14 further comprising:

means for generating the sum of the signals proportional to $u \sin \theta \sin (A-\theta)$, second means for generating a signal proportional to $[u \cos \theta - v \cos (A-\theta)]$, first means for multiplying said signal proportional to $[u \cos \theta - v \cos (A-\theta)]$ and P/R, third means for generating a signal proportional to $[u \sin \theta + v \sin (A-\theta)]$, fourth means for generating a signal proportional to $(P/R) [u \cos \theta - v \cos (A-\theta)] + [u \sin \theta + v \sin (A-\theta)]$, said signal being equal to y, second means for multiplying the time t during which said selected change in speed and course direction takes place by y to thereby generate the signal yt, means for adding the signal proportional to the nearest approach distance P to yt to thereby generate a nearest approach signal P+yt, and means for displaying said nearest approach signal.

* * * * *